Nov. 4, 1958     E. B. WESTLAKE, JR     2,858,654

METHOD OF PRODUCING DESICCANT CONTAINER

Filed Aug. 5, 1952

INVENTOR.
Edward B. Westlake Jr.
BY Henry G. Dybvig
His Attorney

United States Patent Office
2,858,654
Patented Nov. 4, 1958

2,858,654
METHOD OF PRODUCING DESICCANT CONTAINER

Edward B. Westlake, Jr., Havertown, Pa.

Application August 5, 1952, Serial No. 302,679

8 Claims. (Cl. 53—14)

This invention relates to a desiccant container and to the method of manufacturing the same and more particularly to a desiccant container made from either a transparent or an opaque plastic material for use in housing a desiccant such as a suitable silica gel, although not necessarily so limited.

An object of this invention is to provide a container easily manufactured and assembled at a low cost, the container being dimensionally stable in the presence of moisture, and, by variation of thickness of the cover, will prevent moisture transmission to the desiccant or provide for such moisture transmission as may be desired by means of a very thin cover or by holes in the cover or in the base of the assembly.

A further object of this invention is to provide a desiccant cotnainer provided with a flange or lip that replaces the conventional washer now used in association with container caps, thus providing a moisture-proof seal for the top of a bottle which is used to preserve the contents of the bottle, which contents would be harmed by the presence of moisture.

Another object of this invention is to provide a method of manufacturing the cup-like container by the use of a multi-cavity mold, the several cups molded at the same time being held together by a sheet of material integral therewith, which sheet of material may simulate a flash, then filling the cups before severing the cups from the sheet, then cementing or bonding a sheet overlying the cups, this followed by severing the cups and the overlying sheet from the assembly so as to provide individual cups having the dessicant mounted therein.

Another object of this invention is to provide a cup or a container for a desiccant, wherein the cup or container and the cover therefor cooperate to form a radially projecting flange or lip adapted for use in sealing the desiccant cup or container in the top of a bottle for material to be preserved and maintained in a dry state.

Another object of this invention is to provide a transparent desiccant cup made from plastic molding material adapted for mass production, utilizing a small amount of labor and material, resulting in economical production.

Other objects and advantages reside in the construction of parts, the combination thereof and the mode of operation, as will become more apparent from the following description.

Referring to the drawings.

Figure 1:
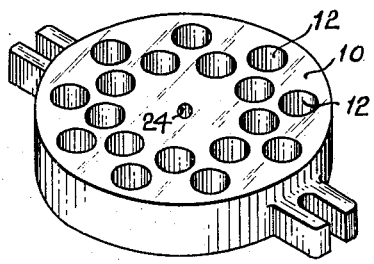
Figure 1 is a perspective view of a multi-cavity mold.
Figure 2:
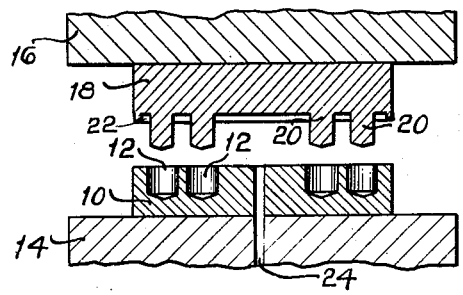
Figure 2 is a cross sectional view of a pair of multi-cavity mold members, the lower female mold member being mounted upon a platen and the upper or male mold member being mounted upon a ram, or vice versa.
Figure 3:
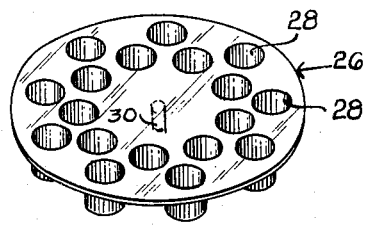
Figure 3 is a perspective view of a member molded upon a multi-cavity mold, wherein a plurality of cup-shaped members are formed, held together by a sheet of material.
Figure 4:
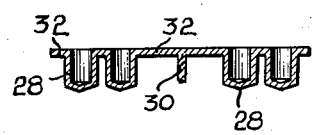
Figure 4 is a cross sectional view of the member shown in Figure 3.
Figure 5:
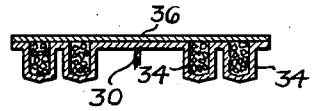
Figure 5 is another cross sectional view showing a top sheet used in forming a cover mounted in position upon a cup filled with a desiccant.
Figure 6:
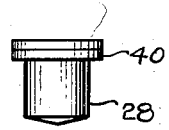

Figure 6 discloses an individual cup-shaped member, together with the cap therefor after being severed or punched from the assembly shown in Figure 5.

Figure 7:
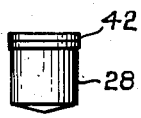

Figure 7 is another modification of a cup and the capping member therefore.

Figure 8:
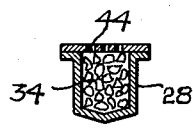

Figure 8 is a cross sectional view of a cup or container having holes in the top thereof.

Figure 9:
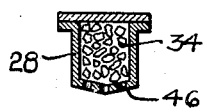

Figure 9 is another cross sectional view of a container having holes in the bottom thereof.

In the drawings, the reference character 10 indicates a multi-cavity mold member provided with a plurality of cavities 12, the number of cavities being optional. This multi-cavity mold member may be mounted upon a mold support or platen 14, associated with a ram 16 having attached thereto a male mold member 18 provided with a plurality of projections 20, there being one projection 20 for each mold cavity 12. A sealing gasket 22 may surround one of the mold members, so as to provide a closed cavity when the two mold members are brought together.

The molding may take place by what is generally referred to in the trade as injection molding, the molding material being supplied through a conduit 24 to fill all of the mold cavities in one operation. The molding material may be properly cured and the mold members separated, so as to permit the removal of the mold member 26 having a plurality of cup-like cylindrical cavities 28. The sprue 30 may be found in the center or in any other suitable position, depending upon the arrangement of the mold. These cup-like members are held together by a thin sheet 32, simulating an ordinary flash.

The cup-shaped cavities 28 are preferably filled with a desiccant chemical 34, as for example, some metallic oxide combined with a silica gel that has the characteristics of changing color in response to moisture coming in contact with the desiccant. The type of chemical is immaterial as far as this invention is concerned.

After the cavities have been filled with the chemical 34, irrespective of what this chemical may be, a sheet of material 36 is superimposed upon member 26. The cover is preferably made from the same material as member 26. This material may be poly vinyl chloride, sometimes sold under the trade name "Vinylite" or polyethylene, or any other suitable plastic material. This plastic material may be transparent for indicating the condition of the chemical in the container, or it may be opaque, especially if either the cover or the container is provided with apertures through which the chemical may be viewed. Instead of utilizing apertures, a plastic may be used having a suitable rate of moisture transmission. Both "Vinylite" and polyethylene are either transparent or semi-transparent. After the cover has been mounted in position, the cover may be welded or united to member 26 by an electronic heat sealing process, applying heat and pressure. The heat may be applied in any other suitable manner, depending upon the available equipment. The application of the heat and pressure seals the cap member to the assembly 26, so that the chemical is enclosed in sealed containers, each cup 28, together with the cover, forming a container. Instead of heat and pressure, a solvent may be used, applied to the surfaces that are to be cemented together immediately prior to the time that the two surfaces are brought into contact, thereby sealing the juncture, or a suitable adhesive or cement may be used, cured in any suitable manner.

The cups 28 may then be punched or severed from the assembly, as shown in Figure 6. This may be accomplished in a punch press having a suitable die. In this particular modification a lip 40 projects radially from the top of the cup-shaped container and may be used as a seal in a cap for a bottle or may be used to secure the cup containing the desiccant in any suitable position. For some purposes it may be desirable to have the cylindrical wall of the cups substantially continuous without a lip, in which event the cover sheet and the cup may be severed, as shown at 42 in Figure 7.

The cover or the closure for the cup-like container may be made from a clear transparent rigid material. The cup-shaped member may be made from flexible plastic material, such as "Vinylite"; but it need not necessarily be clear. When a rigid cap and a flexible cup-shaped member are used, the flange projecting outwardly from the cup-shaped member provides an excellent seal between the cover and the bottle or container. It is then merely necessary to remove the cover from the bottle or container to inspect the condition of the ingredients, without removing the plastic cup and the cap therefor.

The desiccant may be used for various purposes. It may be used as a de-hydrating agent to absorb any residual moisture. When so used, the top may be provided with apertures 44, as shown in Figure 8, or the bottom may be provided with apertures 46, as shown in Figure 9. The apertures 44 and the apertures 46 may be formed at the time the container is manufactured providing it is to be put to use immediately. It may be desirable to store the cap and the container together with the desiccant for a period of time before use. In that event, either the cup-shaped member or the cap therefor may be provided with knock-out plugs to be knocked out at the time the desiccant is to be put to use, or holes may be punched or drilled at that time. In the event the crystals of the desiccant may contaminate the materials, such as medicines or other drugs, with which the desiccant is stored, it is preferable to use a thin wall, either in the cup-shaped member or the cap therefor, which wall has the property of transmitting moisture or vapor to the desiccant. This eliminates the use of holes, thereby eliminating any possibility of the desiccant contaminating the surrounding materials.

If a metallic oxide silica gel is used that has the characteristic of changing color upon being exposed to moisture, these containers may be used to ascertain whether or not a product has been preserved without being contaminated by moisture. For example, fuses may be stored in containers, the fuses having the characteristic of deteriorating in the presence of moisture. When the fuses are to be used, one of these containers may be packed with each batch of fuses. The containers may be provided with suitable apertures. In the event moisture has gotten into the package containing the fuses, the color of the desiccant will have changed, indicating that the fuses have been subjected to moisture and therefore cannot be depended upon.

Instead of placing the sheet of plastic material used in forming the containers in a mold so as to mold the individual cups, the cups may be formed by a blowing or drawing operation, or the cups may be formed by the use of a female mold member having a plurality of cavities, the sheet material overlying the cavities being forced into the cavities by a fluid, either a gaseous fluid or a liquid fluid, to thereby form cup-like cavities in the sheet.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. The method of making a desiccant container assembly comprising molding multiple cavities simultaneously in a sheet of transparent plastic material, inserting a desiccant in all of the cavities simultaneously so as to fill the cavities level full, placing a flat cover sheet of transparent plastic material over the multiple cavities after the cavities have been filled, fusing the plastic material of the cover with the molded sheet by electronic heat so as to seal all of said cavities with a flat cover, placing the multiple cavity unit in a multiple die, stamping out single cavity containers from the multiple cavity unit in one stamping step, and piercing the containers to provide moisture openings therein.

2. The method according to claim 1, wherein the molded sheet and the cover sheet consist of polyethylene.

3. The method of making containers and filling the same with a chemical, said method including the steps of molding multiple cavities simultaneously from a sheet of plastic material, placing a chemical in the cavities before severing the cavities from the sheet, said cavities being filled level full, placing a flat cover of plastic material over the multiple cavities after the chemical has been placed in the cavities, sealing the flat cover to the molded sheet so as to seal all of the cavities, placing the multiple cavity molded sheet and the cover sealed therto into a multiple die, and in one stamping operation stamping out all of the single cavity containers with the chemical therein from the multiple cavity molded sheet and its cover.

4. The method according to claim 3, wherein a transparent sheet of Vinylite is used.

5. The method according to claim 3, wherein the containers are filled with a desiccant chemical and wherein the filled containers are pierced to provide moisture openings.

6. The method of making containers and filling the same with a chemical, said method including the steps of molding multiple cavities simultaneously from a sheet of polyethylene, placing a chemical in the cavities before severing the cavities from the sheet, said cavities being filled level full, placing a flat cover of polyethylene over the multiple cavities after the chemical has been placed in the cavities, sealing the flat cover to the molded sheet so as to seal all of the cavities, placing the multiple cavity molded sheet and the flat cover sealed thereto into a multiple die, and in one stamping operation stamping out all of the single cavity containers with the chemical therein from the multiple cavity molded sheet and its flat cover.

7. The method according to claim 6, wherein each of the single cavity containers is provided with a peripheral lip used as a seal for holding each container in place.

8. The method according to claim 6, wherein each of the single cavity containers is filled with a desiccant and provided with a peripheral lip used as a seal and wherein the method includes the step of piercing holes in the bottoms of the containers.

References Cited in the file of this patent

UNITED STATES PATENTS

| | | |
|---|---|---|
| 2,155,445 | Pittenger et al. | Apr. 25, 1939 |
| 2,172,864 | Calva et al. | Sept. 12, 1939 |
| 2,194,451 | Soubier | Mar. 9, 1940 |
| 2,229,613 | Strauch | Jan. 21, 1941 |
| 2,452,607 | Slaughter | Nov. 2, 1948 |
| 2,469,975 | McCloy | May 10, 1949 |
| 2,487,077 | Shepherd | Nov. 8, 1949 |
| 2,506,806 | Metzger | May 9, 1950 |
| 2,597,704 | Carlson | May 20, 1952 |
| 2,616,232 | Meyer | Nov. 4, 1952 |
| 2,670,501 | Michiels | Mar. 2, 1954 |